United States Patent
Tanaka et al.

(10) Patent No.: US 12,057,272 B2
(45) Date of Patent: Aug. 6, 2024

(54) METHOD FOR MULTILAYER CERAMIC ELECTRONIC DEVICE WITH PUNCHED OUT SIDE MARGIN PARTS

(71) Applicant: TAIYO YUDEN CO., LTD., Tokyo (JP)

(72) Inventors: Shota Tanaka, Tokyo (JP); Joji Kobayashi, Tokyo (JP); Toshimitsu Kogure, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 17/871,841

(22) Filed: Jul. 22, 2022

(65) Prior Publication Data

US 2022/0359122 A1    Nov. 10, 2022

Related U.S. Application Data

(62) Division of application No. 16/870,289, filed on May 8, 2020, now abandoned.

(30) Foreign Application Priority Data

May 9, 2019    (JP) .................................. 2019-088937

(51) Int. Cl.
*H01G 4/30*        (2006.01)
*B32B 38/04*      (2006.01)
(Continued)

(52) U.S. Cl.
CPC ............... *H01G 4/30* (2013.01); *B32B 38/04* (2013.01); *C04B 35/462* (2013.01); *H01G 4/012* (2013.01);
(Continued)

(58) Field of Classification Search
CPC ........ H01G 4/30; H01G 4/012; H01G 4/1218; H01G 4/224; H01G 4/232; H01G 13/006;
(Continued)

(56) References Cited

U.S. PATENT DOCUMENTS

2006/0126264 A1*   6/2006   Yoshii ................... H01G 4/232
                                                                        361/728
2012/0234462 A1     9/2012   Matsui et al.
(Continued)

FOREIGN PATENT DOCUMENTS

JP    2007153631 A  *  6/2007  ........... C04B 35/468
JP    2012-209539 A    10/2012
(Continued)

OTHER PUBLICATIONS

Japanese Office Action dated Apr. 6, 2023 in a counterpart Japanese patent application No. 2019-088937. (A machine translation (not reviewed for accuracy) attached.).
(Continued)

*Primary Examiner* — David M Sinclair
*Assistant Examiner* — Daniel M Dubuisson
(74) *Attorney, Agent, or Firm* — CHEN YOSHIMURA LLP

(57) ABSTRACT

A method for manufacturing a multilayer ceramic electronic device includes punching out a ceramic sheet by one of left and right side surfaces of a laminated body so as to form a side margin part on the one of the left and right side surfaces of said laminated body; and punching out another ceramic sheet by another of the left and right side surfaces of the laminated body so as to form a side margin part on the another of the left and right side surfaces of said laminated body, thereby forming a ceramic main body having the laminated body and the pair of side margin parts that respectively cover the left and right side surfaces of the laminated body. The width W is greater than the length L in the multilayer ceramic electronic device.

4 Claims, 11 Drawing Sheets

(51) Int. Cl.
  *C04B 35/462* (2006.01)
  *H01G 4/012* (2006.01)
  *H01G 4/12* (2006.01)
  *H01G 4/224* (2006.01)
(52) U.S. Cl.
  CPC ........... *H01G 4/1218* (2013.01); *H01G 4/224* (2013.01); *B32B 2038/042* (2013.01); *C04B 2235/6562* (2013.01)
(58) Field of Classification Search
  CPC .... H01G 4/12; B32B 38/04; B32B 2038/042; B32B 18/00; C04B 35/462; C04B 2235/6562; C04B 2237/346; C04B 2237/348; C04B 2237/704; C04B 2237/80
  See application file for complete search history.

(56) References Cited

U.S. PATENT DOCUMENTS

| | | |
|---|---|---|
| 2012/0250220 A1 | 10/2012 | Yamashita et al. |
| 2014/0126110 A1* | 5/2014 | Kim ................... H01G 4/232 361/321.2 |
| 2014/0185184 A1 | 7/2014 | Ahn et al. |
| 2014/0345779 A1* | 11/2014 | Matsui ................... H01G 13/00 156/89.17 |
| 2014/0367152 A1 | 12/2014 | Lee et al. |
| 2015/0255213 A1 | 9/2015 | Lee et al. |
| 2016/0163456 A1 | 6/2016 | Lee et al. |
| 2017/0186546 A1* | 6/2017 | Kato ................... H01G 4/30 |
| 2017/0345572 A1 | 11/2017 | Sasaki et al. |
| 2018/0096793 A1* | 4/2018 | Fukunaga ............ H01G 4/30 |
| 2018/0108482 A1* | 4/2018 | Kogure ................. H01G 4/224 |
| 2018/0114645 A1 | 4/2018 | Ono et al. |
| 2020/0075254 A1 | 3/2020 | Park et al. |

FOREIGN PATENT DOCUMENTS

| | | | |
|---|---|---|---|
| JP | 2015-70218 A | 4/2015 | |
| JP | 2017-216268 A | 12/2017 | |
| JP | 2018-073909 A | 5/2018 | |
| JP | 6329978 B2 * | 5/2018 | ........... C04B 35/468 |

OTHER PUBLICATIONS

Japanese Office Action dated Sep. 5, 2023, in a counterpart Japanese patent application No. 2019-088937. (A machine translation (not reviewed for accuracy) attached.).

* cited by examiner

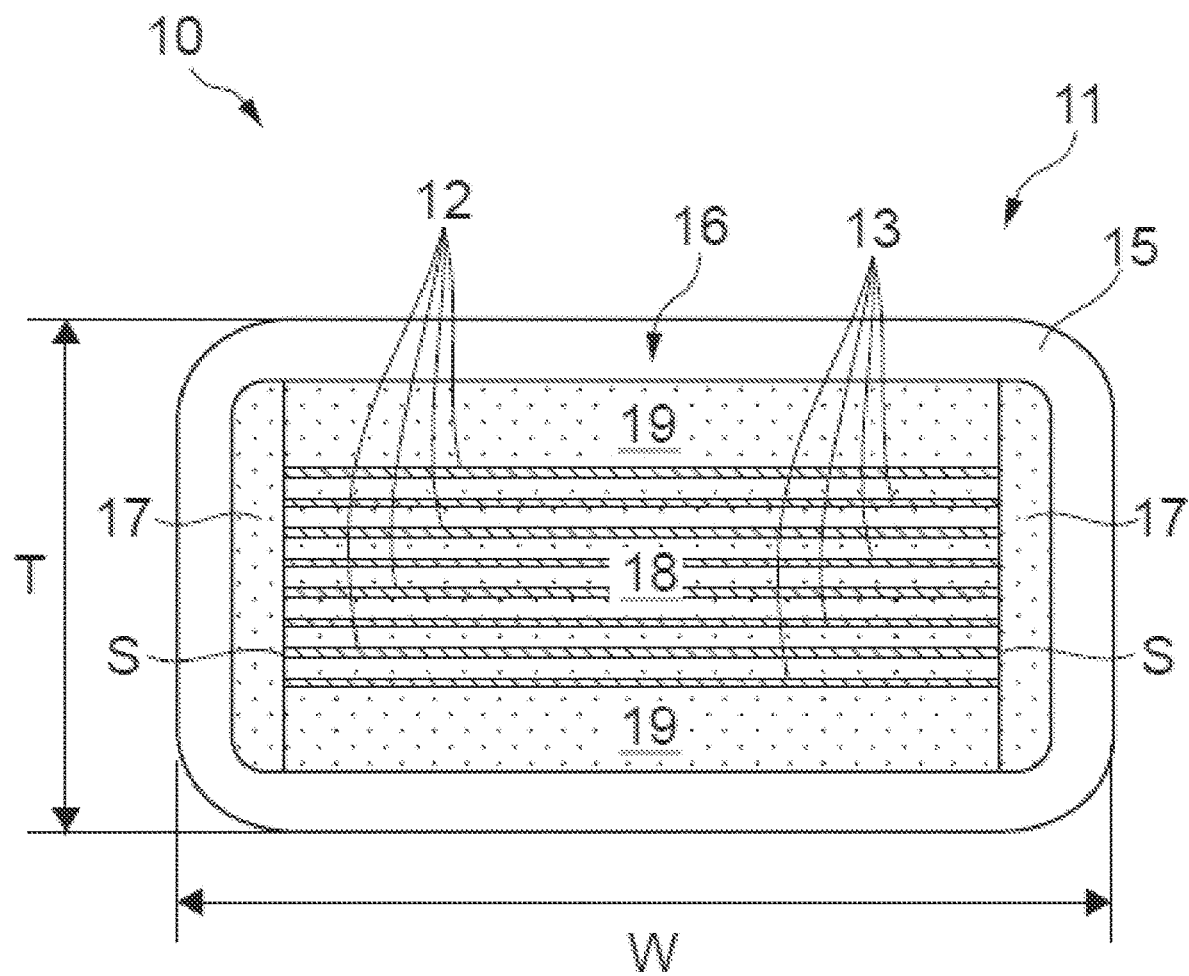
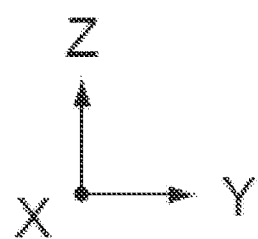
FIG. 3

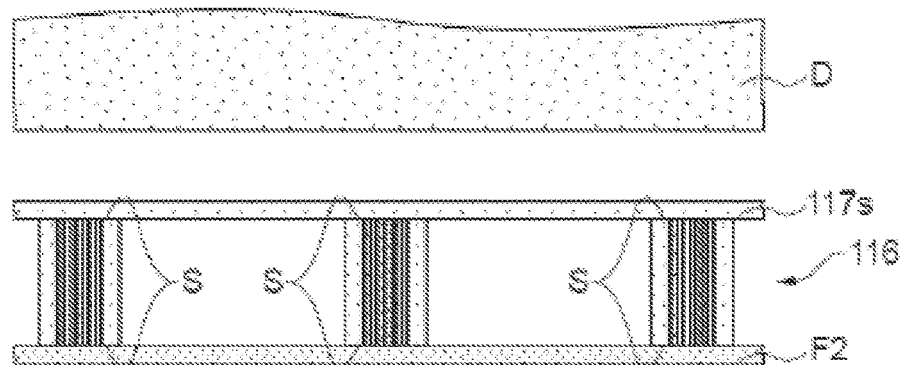
FIG. 10A
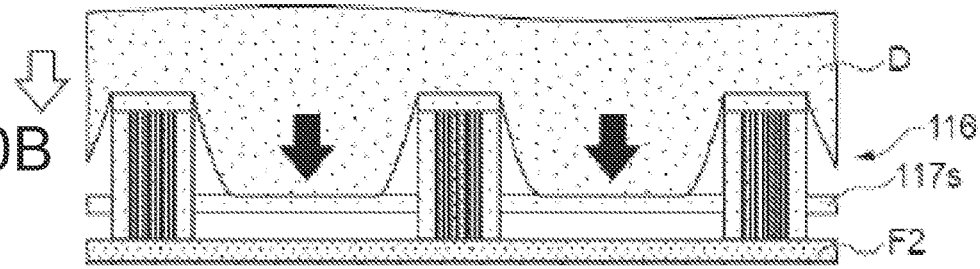
FIG. 10B
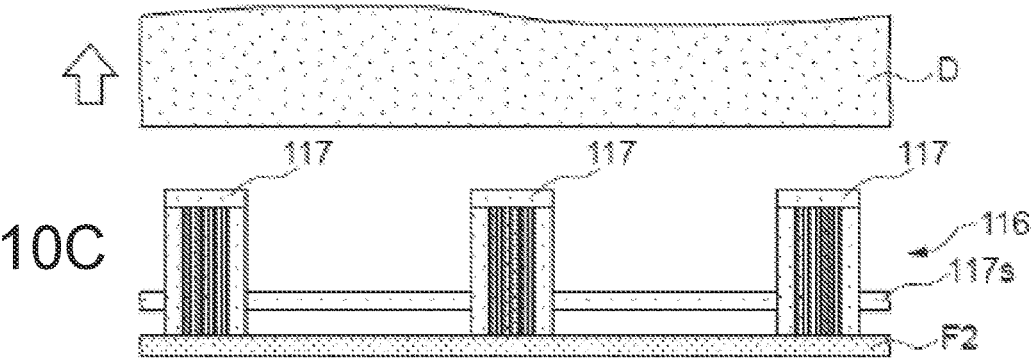
FIG. 10C
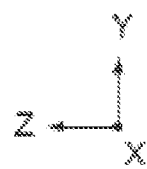

METHOD FOR MULTILAYER CERAMIC ELECTRONIC DEVICE WITH PUNCHED OUT SIDE MARGIN PARTS

BACKGROUND OF THE INVENTION

Technical Field

The present invention relates to a multilayer ceramic electronic device in which side margin parts are attached at a later in the manufacturing process, and a method for making the same.

Background Art

In some of the conventional methods of manufacturing multilayer ceramic capacitors, side margin parts are attached relatively later in time during the manufacture process. See, for example, Patent Document 1. With this technology, even thin side margin parts can securely protect side surfaces of the laminated body that are exposing side ends of internal electrodes. Thus, this is effective for miniaturization and increased capacitance of the multiplayer ceramic capacitors.

For example, in the method of manufacturing the multilayer ceramic capacitors disclosed in Patent Document 1, first, a mother laminated sheet having a plurality of laminated sheets each having an internal electrode is cut to a plurality of laminated bodies each exposing side ends of the internal electrodes on the side surfaces, which are cut surfaces. Then, a separately prepared ceramic sheet is punched out by the respective side surfaces of the laminated bodies so that side margin parts are formed on the side surfaces of the laminated bodies.

RELATED ART DOCUMENT

Patent Document

Patent Document 1: Japanese Patent Application Laid-Open Publication No. 2012-209539

SUMMARY OF THE INVENTION

As electronic devices become more compact and thinner, there is an increasing demand for further miniaturization of multilayer ceramic capacitors. However, the smaller the laminated bodies become in response to the demand for miniaturization, the more difficult it becomes to obtain sufficient shear force for the side surfaces of the laminated bodies to punch out a ceramic sheet in order to form the side margin parts.

In view of the foregoing, an object of the present invention is to provide a multilayer ceramic electronic device suitable for the punchout method for making side margin parts and a method for making such a device.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic electronic device, comprising: a ceramic main body having a laminated body having left and right side surfaces opposite to each other in a widthwise direction and a pair of side margin parts that respectively cover the left and right side surfaces of the laminated body, the laminated body including a plurality of internal electrodes laminated in a vertical direction, side ends of each of the internal electrodes reaching and being flush with the respective side surfaces of the laminated body within a range of 0.5 μm in the widthwise direction, which is normal to the side surfaces, the ceramic main body further having end surfaces opposite to each other in a lengthwise direction; and a pair of external electrodes respectively covering the end surfaces of the ceramic main body, each of the pair of external electrodes being in contact with lateral ends of one or more of the internal electrodes that are exposed from one of the end surfaces, wherein a width dimension W of the multilayer ceramic electronic device in the widthwise direction is greater than a length dimension L of the multilayer ceramic electronic device in the lengthwise direction.

Here, the width dimension W may be equal to or less than 0.45 mm. Further, the width dimension W may be greater than a height dimension T of the multilayer ceramic electronic device.

In another aspect, the present disclosure provides a method for manufacturing a multilayer ceramic electronic device, comprising: forming a laminated body having left and right side surfaces opposite to each other in a widthwise direction, the laminated body including a plurality of internal electrodes laminated in a vertical direction, side ends of each of the internal electrodes reaching and being flush with the respective side surfaces of the laminated body within a range of 0.5 μm in the widthwise direction, which is normal to the side surfaces; punching out a ceramic sheet by one of the left and right side surfaces of said laminated body so as to form a side margin part on the one of the left and right side surfaces of said laminated body; punching out another ceramic sheet by another of the left and right side surfaces of said laminated body so as to form a side margin part on the another of the left and right side surfaces of said laminated body, thereby forming the ceramic main body having the laminated body and the pair of side margin parts that respectively cover the left and right side surfaces of the laminated body, the ceramic main body further having end surfaces opposite to each other in a lengthwise direction; firing the ceramic main body to form a sintered ceramic main body; and forming a pair of external electrodes respectively covering the end surfaces of the sintered ceramic main body, each of the pair of external electrodes being in contact with lateral ends of one or more of the internal electrodes that are exposed from one of the end surfaces, thereby forming the multilayer ceramic electronic device, wherein a width dimension W of the multilayer ceramic electronic device in the widthwise direction is greater than a length dimension L of the multilayer ceramic electronic device in the lengthwise direction.

As described above, the present disclosure provides a multilayer ceramic electronic device suitable for the punchout method for making side margin parts and a method for making such a device.

It is to be understood that both the foregoing general description and the following detailed description are exemplary and explanatory, and are intended to provide further explanation of the invention as claimed.

BRIEF DESCRIPTION OF THE DRAWINGS

FIG. 3 is a cross-sectional view of the multilayer ceramic capacitor taken along the line B-B' of FIG. 1.

FIGS. 10A-10C are cross-sectional views showing a side margin part forming step.

DETAILED DESCRIPTION OF EMBODIMENTS

Figure 1:
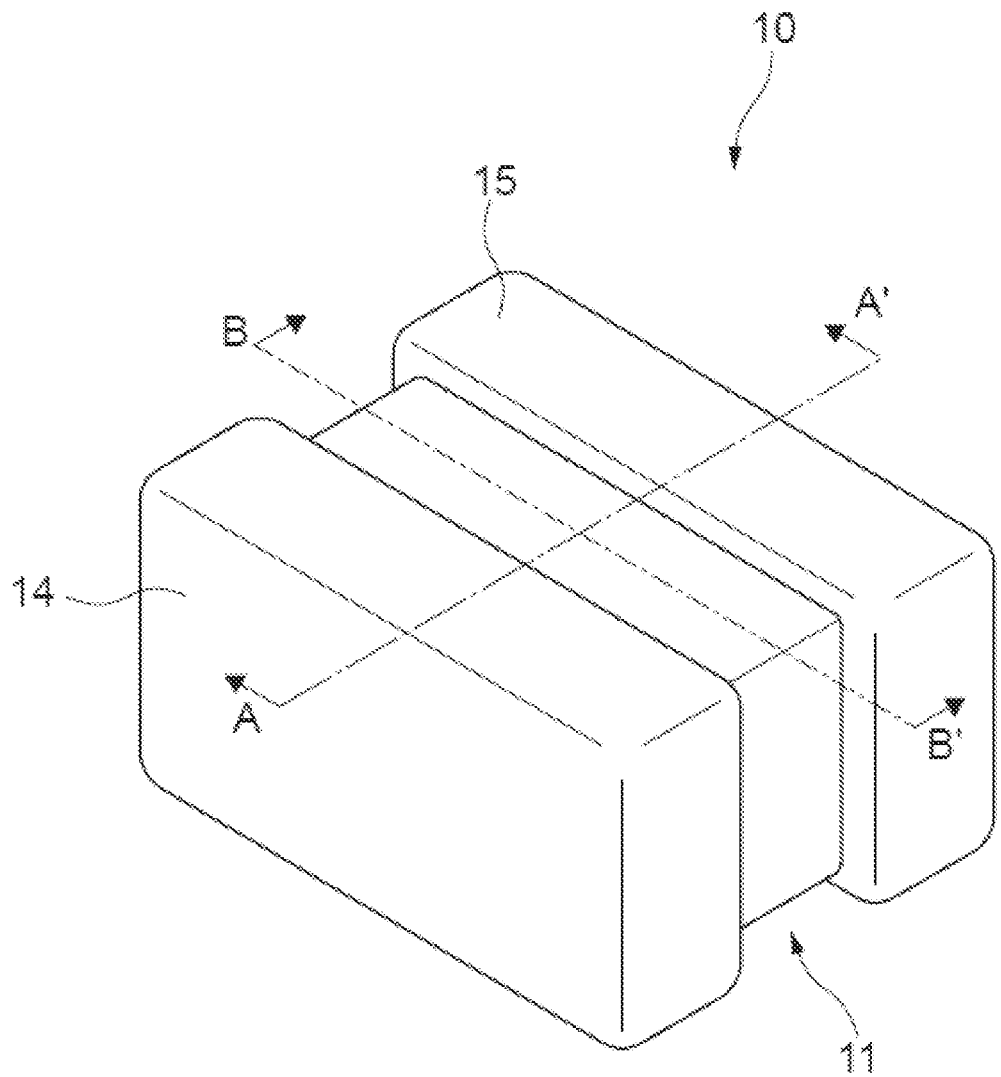
FIG. 1 is a perspective view of a multilayer ceramic capacitor according to an embodiment of the present invention.

Below, embodiments of the present invention will be described with reference to the drawings. In the drawings, the X-axis, the Y-axis and the Z-axis are shown when appropriate. These axes are oriented in the same way for the illustrated devices in all of the drawings.

<Configuration of Multilayer Ceramic Capacitor 10>

Figure 2:
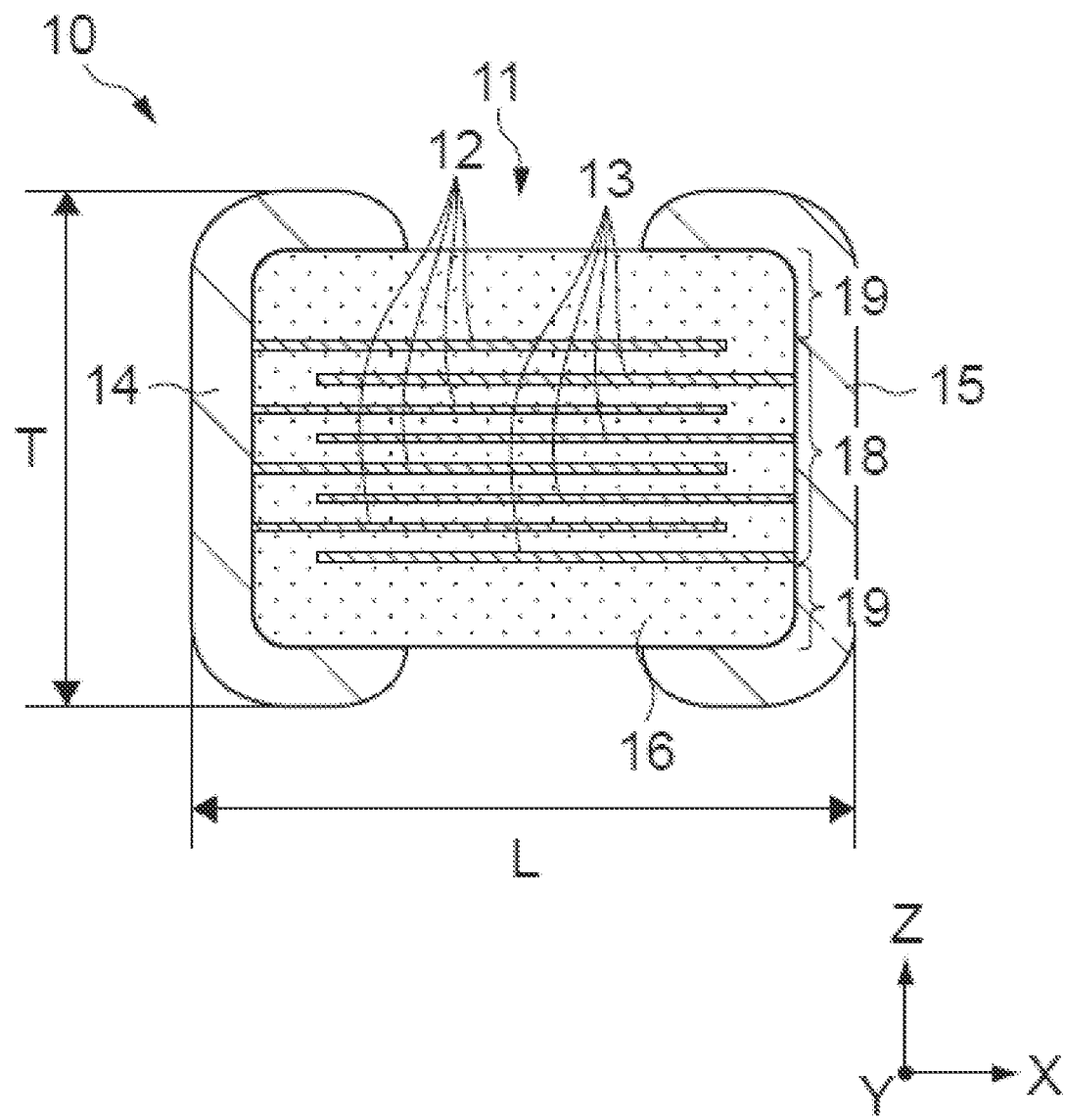
FIG. 2 is a cross-sectional view of the multilayer ceramic capacitor taken along the line A-A' of FIG. 1.

FIGS. 1-3 show a multilayer ceramic capacitor 10 according to an embodiment of the present invention. FIG. 1 is a perspective view of the multilayer ceramic capacitor 10. FIG. 2 is a cross-sectional view of the multilayer ceramic capacitor 10 taken along the line A-A' of FIG. 1. FIG. 3 is a cross-sectional view of the multilayer ceramic capacitor 10 taken along the line B-B' of FIG. 1.

The multiplayer ceramic capacitor 10 includes a ceramic main body 11, a first external electrode 14, and a second external electrode 15. The ceramic main body 11 has a hexahedron shape having a first end surface and a second end surface that are perpendicular to the X-axis, a first side surface and a second side surface that are perpendicular to the Y-axis, and a top surface and a bottom surface that are perpendicular to the Z-axis.

In this embodiment, the first and second external electrodes 14 and 15 cover the respective end surfaces of the ceramic main body 11 and are opposite to each other with the ceramic main body 11 in between. Each of the external electrodes 14 and 15 extends from the corresponding end surface of the ceramic body 11 towards adjacent portions of the top and bottom surfaces and adjacent portions of the side surfaces so that cross section taken along the X-Z plane and cross section taken along the X-Y plane both have a U shape.

Here, the shape of the external electrodes 14 and 15 are not limited to that shown in FIG. 1. For example, each of the external electrodes 14 and 15 may extend from the corresponding end surface to only one of the top and bottom surfaces so that the cross section takin along the X-Z plane has an L shape. Further, each of the external electrodes 14 and 15 may not need to extend to the top or bottom surface or side surfaces.

The external electrodes 14 and 15 are made of a material having a good electric conductivity. Such a material includes a metal that has copper (Cu), nickel (Ni), Tin (Sn), palladium (Pd), platinum (Pt), silver (Ag) or gold (Au) as its main component, or an alloy having those materials as the main components.

The ceramic main body 11 is made of ceramic dielectric, and includes the laminated body 16 and a pair of side margin parts 17. The laminated body 16 has side surfaces S that are perpendicular to the Y-axis. The laminated body 16 also has end surfaces that are orthogonal to the X-axis, which are also end surfaces of the ceramic main body 11, as well as a top surface and a bottom surface that are orthogonal to the Z-axis, which are also respectively a top surface and a bottom surface of the ceramic main body 11.

The laminated body 16 has a structure in which a plurality of planar board shaped ceramic layers that extend in the X-Y plane are laminated in the Z-axis direction. The laminated body 16 has a capacitance formation part 18 and a pair of cover parts 19. The cover parts 19 cover the capacitance formation part 18 from above and below along the Z-axis direction and respectively form the top and bottom surfaces of the laminated body 16.

The capacitance formation part 18 includes a plurality of first internal electrodes 12 and a plurality of second internal electrodes 13 that are disposed between a plurality of ceramic layers. The internal electrodes 12 and 13 each extend in parallel with the X-Y plane and are laminated alternately in the Z-axis direction. That is, the internal electrodes 12 and 13 oppose to each other with the ceramic layers interposed therebetween.

The first internal electrodes 12 each extend towards and reach the end surface of the laminated body 16 that is covered by the first external electrode 14. The second internal electrodes 13 each extend towards and reach the end surface of the laminated body 16 that is covered by the first external electrode 15. With this structure, the first internal electrodes 12 are connected only to the first external electrode 14, and the second internal electrodes 13 are connected only to the second external electrode 15.

Each of the internal electrodes 12 and 13 is formed across the entire width of the capacitance formation part 18 along the Y-axis. That is, the respective side ends of the internal electrodes 12 and 13 in the Y-axis direction extend to and reach the side surfaces S of the laminated body 16. The ends of the internal electrodes 12 and 13 along the Y-axis direction are aligned along (i.e., flush with) the side surface S within a range of 0.5 μm in the Y-axis direction.

The side margin parts 17 respectively cover the side surfaces S of the laminated body 16 that are exposing the side ends of the internal electrodes 12 and 13. With this structure, the electrical insulation is ensured among the side ends of internal electrodes 12 and 13 that are exposed at the side surfaces S of the laminated body 16.

When a voltage is applied between the first external electrode 14 and the second external electrode 15 of this multilayer ceramic capacitor 10, that voltage is applied to a plurality of ceramic layers that are between the first internal electrodes 12 and the second internal electrodes 13. Because of this, the multilayer ceramic capacitor 10 stores electric charges corresponding to the voltage between the first external electrode 14 and the second external electrode 15.

For the ceramic main body 11, in order to provide for large capacitances between the internal electrodes 12 and 13, a ceramic dielectric material having a high permittivity is used. As such a high permittivity ceramic dielectric material, a perovskite material that includes barium (Ba) and titanium (Ti), exemplified by barium titanate ($BaTiO_3$) may be used, for example.

The following materials may also be used instead: the strontium titanate ($SrTiO_3$) system; the calcium titanate ($CaTiO_3$) system; the magnesium titanate ($MgTiO_3$) system; the calcium zirconate ($CaZrO_3$) system; the calcium titanate zirconate ($Ca(Zr, Ti)O_3$) system; the barium zirconate ($BaZrO_3$) system; and the titanium dioxide ($TiO_2$) system.

The internal electrodes 12 and 13 are made of a material having a good conductivity. Typically, nickel (Ni) is used as such a material. Other than Ni, a metal that has copper (Cu), palladium (Pd), platinum (Pt), silver (Ag) or gold (Au) as its main component, or an alloy having these materials as its main components may be used.

FIGS. 2 and 3 indicate the dimension L in the X-axis direction, the dimension W in the Y-axis direction, and the dimension L in the Z-axis direction of the multilayer ceramic capacitor 10. The multilayer ceramic capacitor 10 of this embodiment is configured to have a long Y-axis dimension, which differs from conventional multilayer ceramic capacitor 10 that had a long X-axis dimension. That is, in the multilayer ceramic capacitor 10 of the present embodiment, the Y-axis dimension W is greater than the X-axis dimension L.

Due to this structure of the multilayer ceramic capacitor 10, the volume of the side margin parts 17 may be made small. Because of this, the capacitance formation part that forms a capacitance can be made larger, which is advantageous for miniaturization and larger capacitance.

In the multilayer ceramic capacitor 10, because of the structure of the long Y-axis dimension and the short X-axis dimension, side margin parts 17 can be appropriately formed in the side margin part formation step, which will be described below. From a similar point of view, it is preferable that the Y-axis dimension W be larger than the Z-axis dimension T.

When small capacitors are manufactured—for example, when the dimension W is equal to or less than 0.45 mm—it is difficult to form the side margin parts effectively. Because of the structure described above for the multilayer ceramic capacitor 10, it becomes possible to form the side margin parts 17 effectively even when the dimension W is equal to or less than 0.45 mm.

That is, the multilayer ceramic capacitor 10 has the structure that enables effective formation of the side margin parts 17 while keeping the capacitance value at the same level as that of the conventional structure having the long X-axis dimension. Thus, the multilayer ceramic capacitor 10 has manufacturing advantages as well as functional advantages.

In the multilayer ceramic capacitor 10, the X-axis dimension L, the Y-axis dimension W, and the Z-axis dimension T can be determined such that the above-described structural condition is met. For example, the dimension L may be 0.2 mm, the dimension W may be 0.4 mm, and the dimension T may be 0.2 mm.

<Manufacturing Method of the Multilayer Ceramic Capacitor 10>

Figure 4:
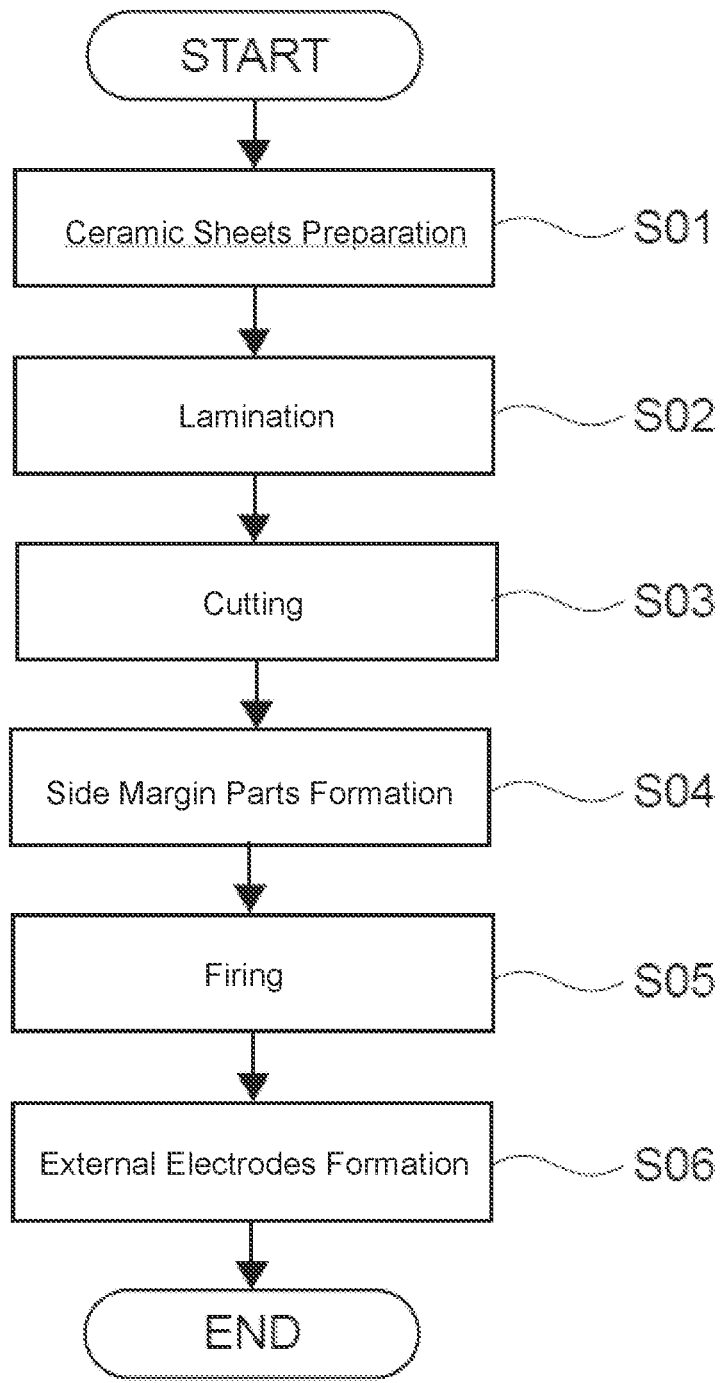
FIG. 4 is a flowchart showing a manufacturing method of the multilayer ceramic capacitor.
Figure 5:
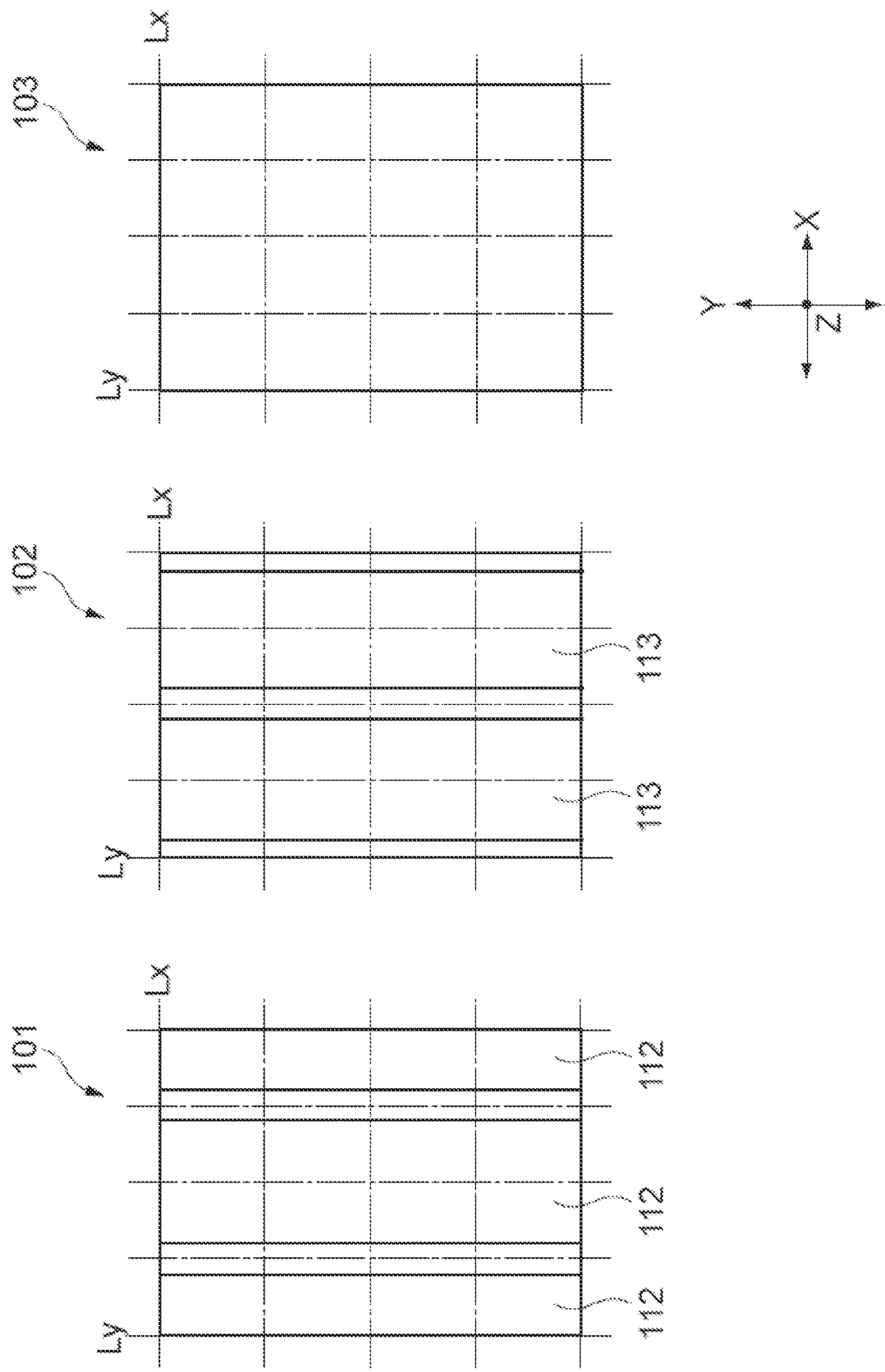
FIGS. 5A-5C show plan views of ceramic sheets used in preparatory processes of the manufacturing method of the multiplayer ceramic capacitor.

FIG. 4 is a flowchart showing a manufacturing method of the multilayer ceramic capacitor 10 according to an embodiment of the present invention. FIGS. 5A-10C are figures showing the manufacturing steps of the multilayer ceramic capacitor 10. Below, the manufacturing method will be explained by following the flowchart of FIG. 4 with reference to FIGS. 5A-10C.

(Step S01: Ceramic Sheets Preparation)

In Step S01, a plurality of first ceramic sheets 101 and a plurality of second ceramic sheets 102, which are for forming capacitor formation parts 18, and a plurality of third ceramic sheets 103, which are for forming cover parts 19, are prepared. The ceramic sheets 101, 102, and 103 are dielectric green sheets, which are yet to be fired, having a ceramic dielectric as the main component.

The ceramic sheets 101, 102, and 103 are formed into sheet shapes using a roll coater or a doctor blade. The thickness of the ceramic sheets 101 and 102 are adjusted in accordance with the target thickness of the ceramic layers in the capacitance formation part 18 after firing. The thickness of the ceramic sheets 103 may separately be adjusted in an appropriate manner.

FIGS. 5A-5C are plan views of the ceramic sheets 101, 102, and 103, respectively. At this point, the ceramic sheets 101, 102, and 103 are mother sheets that are to be separated. FIGS. 5A-5C show cutting lines Lx and Ly that will divide the mother sheets into multiple pieces for respective multilayer ceramic capacitors 10. The cutting line Lx is parallel to the X-axis and the cutting line Ly is parallel to the Y-axis.

As shown in FIGS. 5A-5C, first internal electrodes 112 that are yet to be fired, which will become the first internal electrodes 12, are formed on the first ceramic sheet 101, and second internal electrodes 113 that are yet to be fired, which will become the second internal electrodes 13, are formed on the second ceramic sheet 102. No internal electrode is formed on the third ceramic sheet 103, which will become the cover part 19.

The internal electrodes 112 and 113 may be formed by applying an appropriate conductive paste to the ceramic sheets 101 and 102, respectively. The application method may be chosen from among well-known methods. For example, screen printing or gravure printing may be used for the application of the conductive paste.

In the internal electrodes 112 and 113, spaces that extend in the Y-axis direction are provided along the cutting lines Ly for every other cutting lines Ly. The spaces in the first internal electrodes 112 and the spaces in the second internal electrodes 113 are arranged in the X-axis direction in an alternating manner. That is, the cutting lines Ly that pass through the spaces of the first internal electrodes 112 and the cutting lines Ly that pass through the spaces of the second internal electrodes 113 are alternately arranged.

(Step S02: Lamination)

Figure 6:
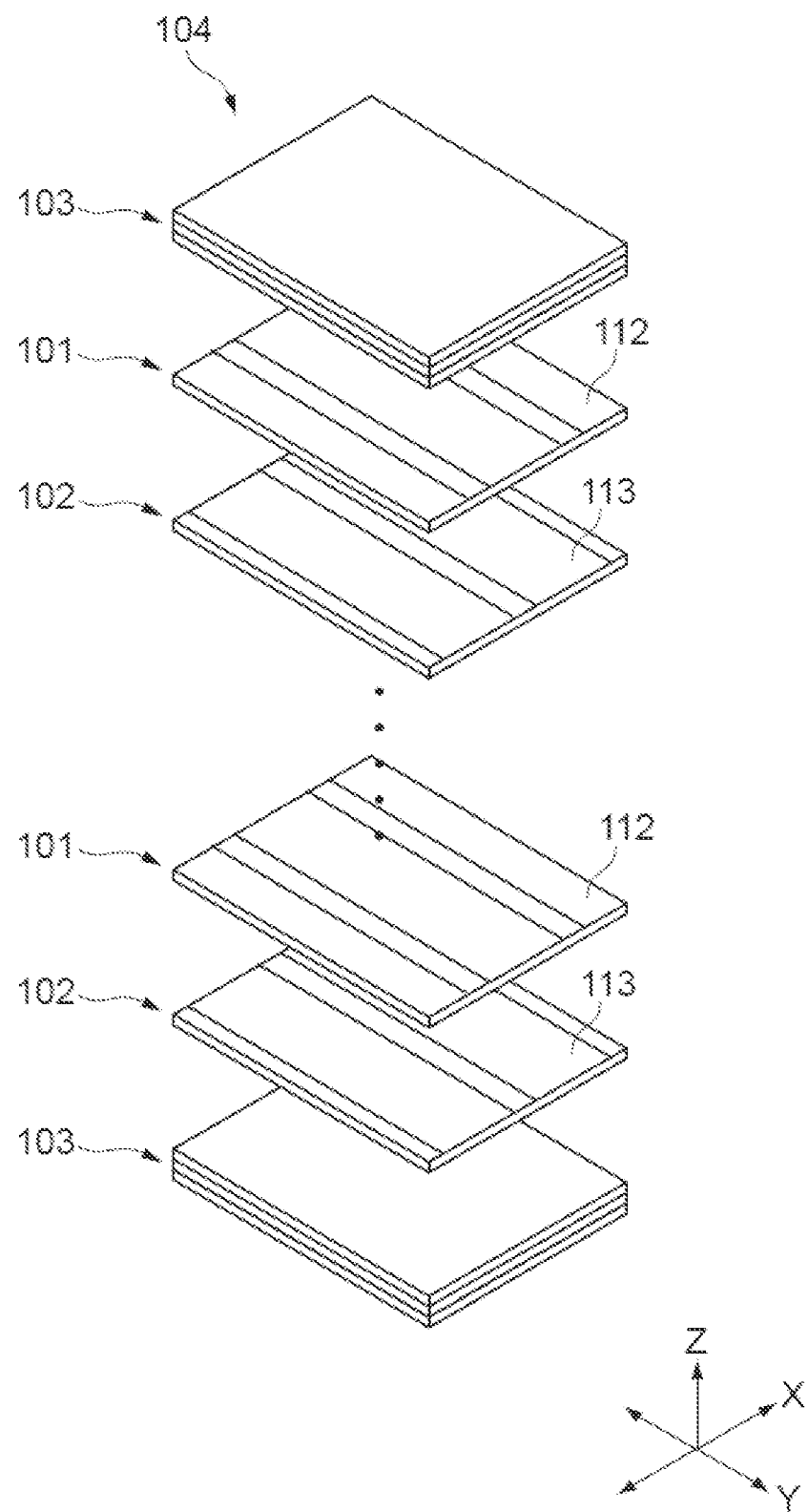
FIG. 6 is a perspective view showing a laminating step in the manufacturing method of the multiplayer ceramic capacitor.

In step S02, the ceramic sheets 101, 102, and 103, which have been prepared in Step S01, are laminated as shown in FIG. 6 to form a mother laminated sheet 104. In the mother laminated sheet 104, the first ceramic sheets 101 and the second ceramic sheets 102 are alternately laminated in the Z-axis direction.

In the mother laminated sheet 104, the third ceramic sheets 103, which correspond to cover part 19, are laminated on the top and on the bottom of the laminated ceramic sheets 101 and 102. Here, although an example of FIG. 6 shows three sheets of the third ceramic sheets 103 are laminated on the top and on the bottom, the number of sheets for the third ceramic sheets 103 may be changed as needed.

The mother laminated sheet 104 is integrated by pressing the laminated ceramic sheets 101, 102, and 103. The pressing process may preferably be performed by hydrostatic pressing or uniaxial pressing, for example. This way, highly packed mother laminated sheet 104 can be obtained.

(Step S03: Cutting)

In step S03, laminated bodies 116, which are yet to be fired, are obtained by cutting the mother laminated sheet 104, which have been made in step S02, along the cutting lines Lx and Ly. The laminated bodies 116 will become the laminated bodies 16 after being fired. For cutting the mother laminated sheet 104, a force-cutting blade or a rotary blade may be used.

Figure 7:
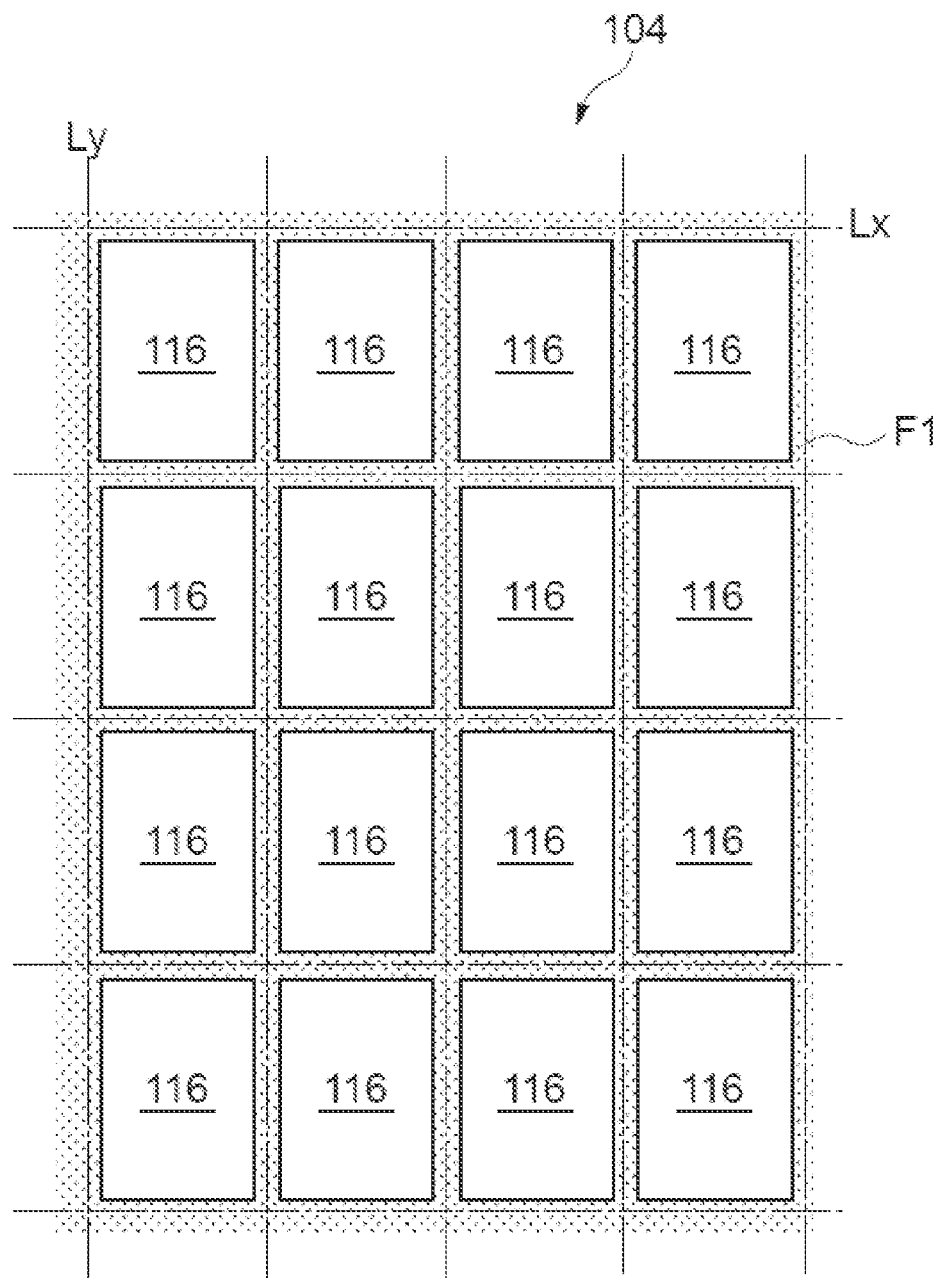
FIG. 7 is a plan view showing a cutting step in the manufacturing method.
Figure 8A:
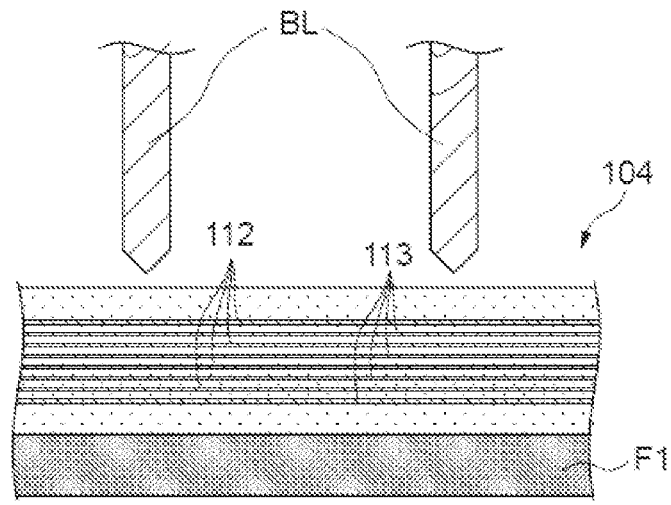
FIGS. 8A-8C are partial cross-sectional views showing the cutting step in the manufacturing method.
Figure 8B:
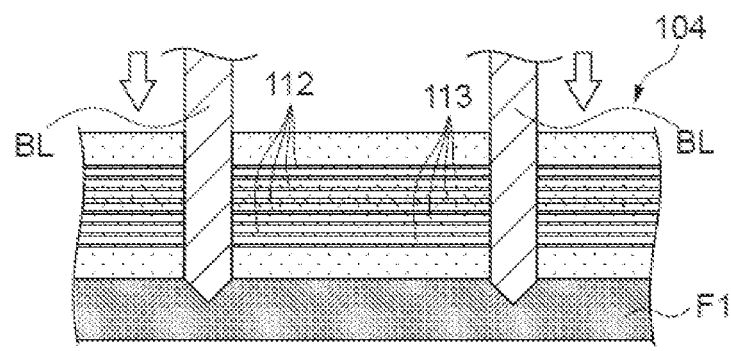
Figure 8C:
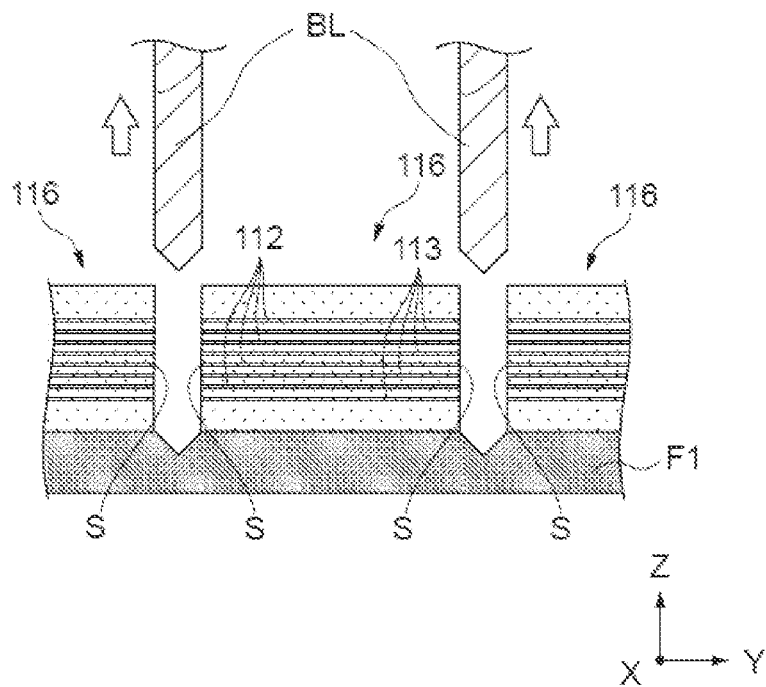

FIGS. 7 and 8A-8C schematically show an example of step S03. FIG. 7 is a plan view of the mother laminated sheet 104. FIGS. 8A-8C are cross-sectional views of the mother laminated sheet 104 taken along the Y-Z plane. The mother laminated sheet 104 is cut by the force-cutting blades BL along the cutting lines Lx and Ly while it is supported by an adhesive sheet F1, which is a foam-release sheet, for example.

First, as shown in FIG. 8A, the force-cutting blades BL are arranged above the mother laminated sheet 104—an upper position in the Z-axis direction—with the respective tips of the blades BL facing the negative Z-axis direction towards the mother laminated sheet 104. Next, as shown in FIG. 8B, the force-cutting blades BL are moved downward in the negative Z-axis direction until they reach the adhesive sheet F1 so that the blades BL penetrates through the mother laminated sheet 104.

Next, as shown in FIG. 8C, the force-cutting blades BL are moved upward in the Z-axis direction so that they are removed from the mother laminated sheet 104. This way, the mother laminated sheet 104 are cut in the X-axis and Y-axis directions and separated into laminated bodies 116 having the side surfaces S each exposing the side ends of the internal electrodes 112 and 113.

(Step S04: Side Margin Parts Formation)

Figure 9:
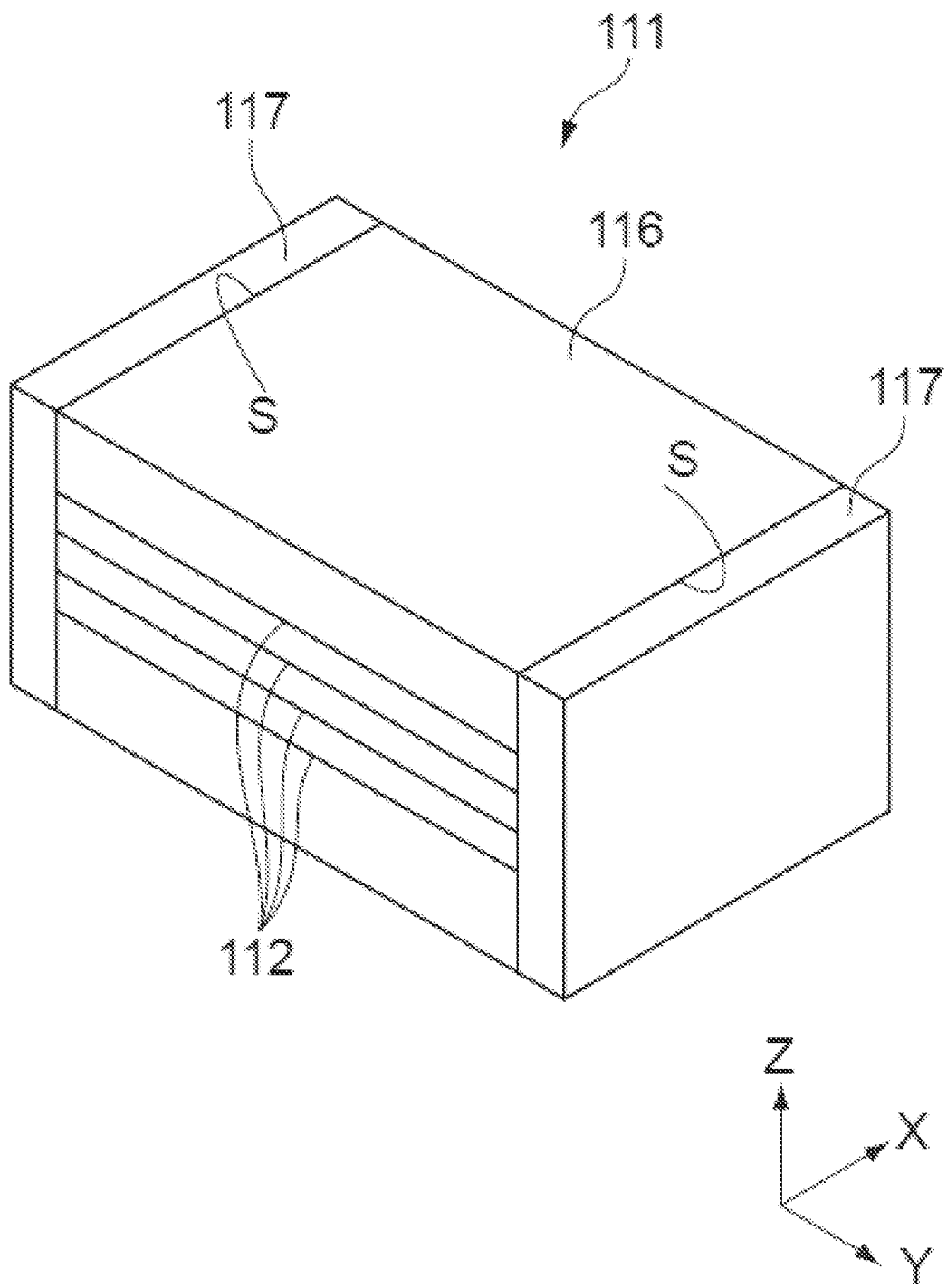
FIG. 9 is a perspective view of a laminated structure that is yet to be fired in the manufacturing method.

In step S04, side margin parts 117 that are yet to be fired are formed on side surfaces S of the laminated bodies 116, which have been obtained in step S03. This forms the ceramic main body 111, as shown in FIG. 9, in which the side surfaces S, which expose side ends of the internal electrodes 11, and 113, are respectively covered by the side margin parts 117.

In this embodiment, the side margin parts 117 are formed by the punchout method in which a ceramic sheet 117s is punched out by the side surface S of the laminated body 116. In particular, in this embodiment, by punching out the ceramic sheet 117s by a plurality of ceramic bodies 116 at once, the side margin parts 117 are formed on a plurality of the laminated bodies 116 at the same time.

FIGS. 10A-10C are cross-sectional views showing an example of step S04. In step S04, first, the laminated bodies 116, which went through the step S03 of FIG. 8C, are rotated 90 degrees so that the side surfaces S of the respective laminated bodies 116 face upwards and downwards rather than sideways. In changing the orientation of the respective laminated bodies 116 by 90 degrees, a plurality of laminated bodies 116 may be rotated at once, for example.

To do this, for example, the adhesive sheet F1 may be replaced with a stretchable adhesive sheet F2, and the stretchable adhesive sheet F2 is stretched so as to expand respective spaces in the Y-axis direction between the laminated bodies 116 before rotating the laminated bodies 116. This way, it is easier to rotate the laminated bodies 116 on the adhesive sheet F2.

Thereafter, as shown in FIG. 10A, a ceramic sheet 117s is placed on the side surfaces S of the respective plurality of laminated bodies 116, which have been rotated 90 degrees. The ceramic sheet 117s is a dielectric green sheet, which is yet to be fired, that can be manufactured in the same way as the ceramic sheets 101, 102, and 103 prepared in step S01 above.

In order to punch out the ceramic sheet 117s by the side surfaces S of the plurality of laminated bodies 116, an elastic member D having the shape of a planar board extending in a horizontal plane is used. The elastic member D preferably has a low elasticity and is made of, for example, a low elasticity rubber. The elastic member D is positioned above the ceramic sheet 117s.

Next, as shown in FIG. 10B, the elastic member D is moved downwards until it contacts the ceramic sheet 117s, and then, the elastic member D is moved further downwards to push the ceramic sheet 117s downwards. As a result, the elastic member D elastically deforms and enters into spaces between the laminated bodies 116.

By this action, the elastic member D pushes down segments of the ceramic sheet 117s that are not supported by the side surfaces S of the laminated bodies 116. As a result, the ceramic sheet 117s receives shear force in the up and down directions along the contours of the laminated bodies 116, and the ceramic sheet 117s is cut along the contours of the side surfaces S of the laminated bodies 116 due to the shear force.

Thereafter, the elastic member D is moved upwards, as shown in FIG. 10C, so as to be separated from the ceramic sheet 117s. The portions of the ceramic sheet 117s that are left on the side surfaces S of the respective laminated bodies 116 constitute the side margin parts 117 that are yet to be fired. The remaining portions of the ceramic sheet 117s left in the spaces between the plurality of laminated bodies 116 are removed.

Then, the orientation of the plurality of laminated bodies 116 is changed by 180 degrees by transferring the laminated bodies 116 from the adhesive sheet F2 to anther adhesive tape, and the side margin parts 117 are formed on the opposite side surfaces S of the plurality of laminated bodies 116 in the same manner as described above. This completes the manufacture of the ceramic main bodies 111 that are yet to be fired, as shown in FIG. 9.

Step S04 will be explained further in the case of a comparison example of a multilayer ceramic capacitor. The comparison example has a typical conventional structure; the X-axis dimension L is larger than the Y-axis dimension W. That is, the laminated body 116a of the comparison example has a smaller Y-axis dimension.

Figure 11:
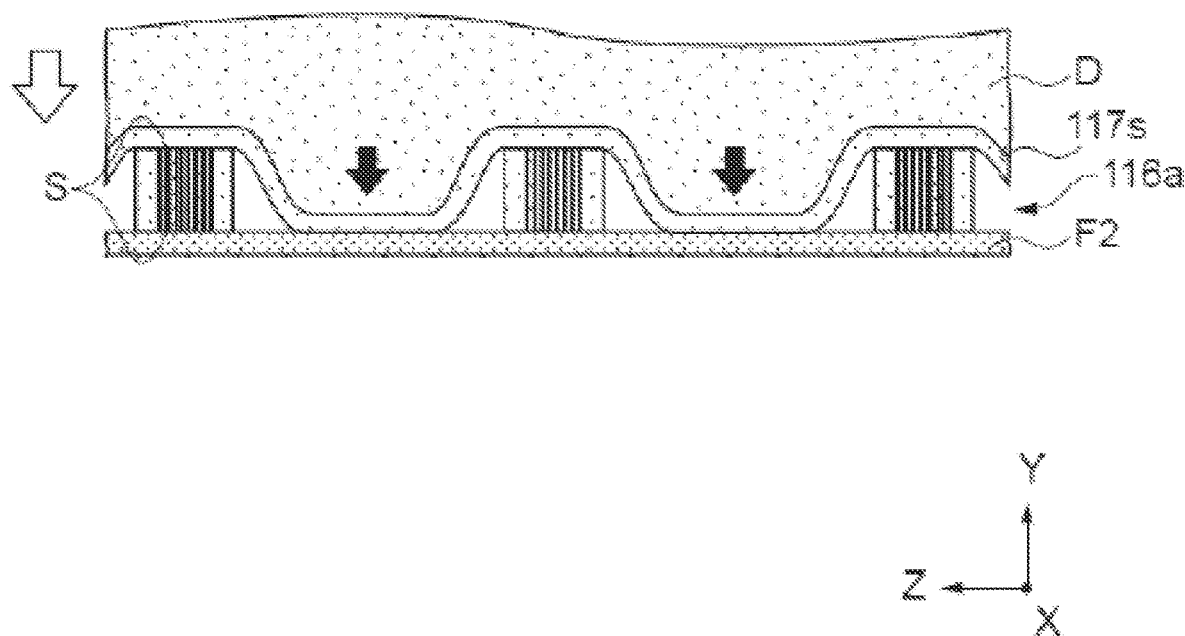
FIG. 11 is a cross-sectional view showing a comparison example during the side margin part forming step.

FIG. 11 shows a situation where the ceramic sheet 117s, which is placed on the side surfaces S of the laminated bodies 116a of the comparison example is pressed down by the elastic member D. As shown in FIG. 11, because the shear force is insufficient, the ceramic sheet 117s reaches the adhesive sheet F2 before being punched out, and cannot be pushed further down by the elastic member D.

That is, because the laminated body 116a has a smaller Y-axis dimension, a sufficient downward displacement of the ceramic sheet 117s necessary for punchout cannot be obtained. Therefore, for multilayer ceramic capacitors, from the perspective of performing the punchout method for forming side margin parts 117, the present invention's structure of the dimension W being greater than the dimension L is advantageous.

(Step S05: Firing)

In step S05, the ceramic main body 111 that has been obtained in step S04 is fired to manufacture the ceramic main body 11 for the multilayer ceramic capacitor 10 shown in FIGS. 1 to 3. That is, in step S05, the laminated body 116 becomes the laminated body 16 and the side margin parts 117 become the side margin parts 17.

The firing temperature in step S05 can be determined based on the sintering temperature of the ceramic main body 111. For example, when the barium titanate ($BaTiO_3$) system material is used, the firing temperature may be set to 1000°

C. to 1300° C. or the like. Also, the firing process may be performed in a reducing atmosphere or in a low oxygen partial pressure atmosphere.

(Step S06: External Electrode Formation)

In step S06, external electrodes 14 and 15 are formed on the respective end surfaces of the ceramic main body 11, which has been obtained in step S05. This completes the manufacture of the ceramic capacitor 10 shown in FIGS. 1-3. The method of forming the external electrodes 14 and 15 may be appropriately chosen from among well-known conventional methods.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention. Further, the concept described above with respect to the multilayer ceramic capacitor 10 is applicable to multilayer ceramic electronic devices in general. For example, the present disclosure is applicable to chip varistors, chip thermistors, multilayer inductors, and the like.

What is claimed is:

1. A method for manufacturing a plurality of multilayer ceramic electronic devices, comprising:

laminating a plurality of green sheets on a stretchable adhesive sheet;

cutting the plurality of green sheets on the stretchable adhesive sheet in a vertical direction by a blade in a matrix pattern without cutting through the stretchable adhesive sheet so as to produce a plurality of the laminated bodies having same orientations attached to the stretchable adhesive sheet, each of the plurality of laminated bodies having left and right side surfaces opposite to each other in a widthwise direction, each of the plurality of laminated bodies including a plurality of internal electrodes laminated in the vertical direction, side ends of each of the internal electrodes reaching and being flush with the respective side surfaces of the laminated body within a range of 0.5 μm in the widthwise direction, which is normal to the side surfaces, a width dimension of each of the plurality of laminated bodies in the widthwise direction being greater than a length dimension of the laminated body in the lengthwise direction;

stretching the stretchable adhesive sheet on which the plurality of the laminated bodies are attached so as to increase respective spaces between the plurality of the laminated bodies;

rotating the plurality of the laminated bodies on the stretched stretchable adhesive sheet by 90 degrees so that one of the left and right side surfaces of each of the laminated bodies faces a direction away from the stretched stretchable adhesive sheet;

pushing down a ceramic sheet onto said one of the left and right side surfaces of each of the plurality of laminated bodies by an elastic member to punch out the ceramic sheet so as to form a side margin part on the one of the left and right side surfaces of each of the laminated bodies arranged on the stretchable adhesive sheet at once;

thereafter, transferring the plurality of laminated bodies onto another adhesive sheet so that another of the left and right side surfaces of each of the laminated bodies faces a direction away from said another adhesive sheet;

thereafter pushing down another ceramic sheet onto said another of the left and right side surfaces of each of the plurality of laminated bodies by the elastic member to punch out said another ceramic sheet so as to form a side margin part on the another of the left and right side surfaces of each of the plurality of laminated bodies arranged on said another adhesive sheet at once, thereby forming a plurality of ceramic main bodies each having the laminated body and the pair of side margin parts that respectively cover the left and right side surfaces of the laminated body, each ceramic main body further having end surfaces opposite to each other in a lengthwise direction;

firing each of the plurality of ceramic main bodies to form a plurality of sintered ceramic main bodies; and on each of the plurality of sintered ceramic main bodies, forming a pair of external electrodes respectively covering the end surfaces of the sintered ceramic main body, each of the pair of external electrodes being in contact with lateral ends of one or more of the internal electrodes that are exposed from one of the end surfaces, thereby forming the plurality of multilayer ceramic electronic devices, wherein a width dimension W of each of the multilayer ceramic electronic devices in the widthwise direction is greater than a length dimension L of each of the multilayer ceramic electronic devices in the lengthwise direction.

2. The method according to claim 1, wherein the width dimension W is equal to or less than 0.45 mm.

3. The method according to claim 1, wherein the width dimension W is greater than a height dimension T of the multilayer ceramic electronic device.

4. The method according to claim 3, wherein the length dimension L of each of the multilayer ceramic electronic devices is 0.2 mm, the width dimension W is 0.4 mm, and the height dimension T is 0.2 mm.

* * * * *